United States Patent [19]

Brayshaw

[11] Patent Number: 5,434,573
[45] Date of Patent: Jul. 18, 1995

[54] THREE TERM RIPPLE SUPRESSION

[75] Inventor: Jeffrey A. Brayshaw, San Diego, Calif.

[73] Assignee: Hughes Aircraft Company, Los Angeles, Calif.

[21] Appl. No.: 269,462

[22] Filed: Jun. 30, 1994

[51] Int. Cl.⁶ .................................. G01S 7/292
[52] U.S. Cl. .............................. 342/159; 342/195
[58] Field of Search .............. 342/195, 159, 39, 189, 342/203, 378, 379

[56] References Cited

U.S. PATENT DOCUMENTS

| | | | |
|---|---|---|---|
| 3,596,209 | 7/1971 | Picard | 330/43 |
| 3,610,901 | 10/1971 | Lynch | 364/724.01 |
| 4,021,812 | 5/1977 | Schell et al. | 343/753 |
| 4,352,074 | 9/1982 | Blinchikoff et al. | 331/17 |
| 4,395,686 | 7/1983 | Adam | 333/151 |
| 4,937,584 | 6/1990 | Gabriel et al. | 342/378 |
| 5,003,546 | 3/1991 | Lidgard et al. | 372/26 |
| 5,093,667 | 3/1992 | Andricos | 342/372 |
| 5,136,265 | 8/1992 | Pritchett | 333/139 |

*Primary Examiner*—John B. Sotomayor
*Attorney, Agent, or Firm*—Leonard A. Alkov; W. K. Denson-Low

[57] ABSTRACT

Three term ripple suppression apparatus for suppressing ripple in a radar image derived from received radar signals. The ripple suppression apparatus comprises a field programable gate array having a radar signal input, a clock signal input, a code select signal input, and a radar signal output. The field programable gate array is adapted to implement a transfer function having the form $$Y(n) = X(n)\left[ z^{-2N} - B\frac{(1-z^{-2N})z^{-(N+1)}}{1-z^{-2}} + C\frac{(1-z^{-2N})^2 z^{-2}}{(1-z^{-2})^2} \right]$$

where z is a unit delay operator, and where B and C are coefficients that are set based on the code length N. First and second multipliers are respectively coupled to the field programable gate array that are adapted to receive first (B) and second (C) coefficients and transfer them to the field programable gate array for use in processing the radar signals using the transfer function. Code lengths of 1, 3, 7, and 13 are supported by the currently implemented three term ripple suppression apparatus. The present invention is compact, reliable, reprogrammable, draws relatively little power, and is relatively inexpensive to develop.

6 Claims, 3 Drawing Sheets

THREE TERM RIPPLE SUPRESSION

BACKGROUND

The present invention relates generally to radar systems, and more particularly, to ripple suppression apparatus for use in millimeter wave radar systems, and the like.

The present invention is adapted to implement a three-term ripple suppression algorithm first documented in the IEEE Transactions on Aerospace and Electronics Systems, Volume AES-7, No. 6, November 1971, page 1087. Implementation of an algorithm of this type is necessary in radar systems employing Barker codes in order to suppress range sidelobes to an acceptable level.

Conventional implementations of a three-term ripple suppression algorithm generally require a larger number of integrated circuits or a custom large scale integrated circuit. A design employing a large scale integrated circuit would be relatively expensive to develop. Designs implemented with other than a large scale integrated circuit or the concepts of the present invention would be relatively cosily to produce, have a relatively large power requirement, and have a relatively large physical size. Prior implementations of the three-term ripple suppression algorithm are not reprogrammable.

Accordingly, it is an objective of the present invention to provide for reprogrammable, three term ripple suppression apparatus for use in radar systems.

SUMMARY OF THE INVENTION

The present invention comprises three term ripple suppression apparatus for suppressing ripple in a radar image derived from received radar signals. The ripple suppression apparatus comprises a field programmable gate array having a radar signal input, a clock signal input, a code select signal input, and a radar signal output. The field programmable gate array is adapted to implement a transfer function having the form $$Y(n) = X(n)\left[ z^{-2N} - B\frac{(1 - z^{-2N})z^{-(N+1)}}{1 - z^{-2}} + C\frac{(1 - z^{-2N})^2 z^{-2}}{(1 - z^{-2})^2} \right]$$

where z is a unit delay operator, and where B and C are coefficients that are set based on a code length N. First and second multipliers are respectively coupled to the field programmable gate array that are adapted to receive first (B) and second (C) coefficients and transfer them to the field programmable gate array for use in processing the radar signals using the above-cited transfer function.

The present invention is the first known implementation of a three-term ripple suppression algorithm using a field programmable gate array. The architecture of the present invention contains only three major integrated circuits, including the field programmable gate array, and two 32-bit multipliers. Code lengths of 1, 3, 7, and 13 are supported by the currently implemented three term ripple suppression apparatus. The present invention improves over conventional designs that generally require substantially more components and therefore draw more power, or cost significantly more to develop, such as an application specific integrated circuit (ASIC). The present invention is compact, reliable, and reprogrammable.

The present invention is adapted for use in a millimeter wave radar imaging system that may be employed on commercial aircraft, for example. The present invention may be used on any similar radar system requiring ripple suppression. The present invention, due to its reprogrammability, may be easily adapted for code lengths other than 1, 3, 7, and 13.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and wherein.

DETAILED DESCRIPTION

The present implements a three term ripple suppression algorithm first documented in the IEEE Transactions on Aerospace and Electronics Systems article cited in the Background section. A algorithm of this type is necessary in radar systems employing Barker codes to suppress the range sidelobes to an acceptable level. This particular algorithm lowers the relative sidelobe level from −22.3 dB to −43.8 dB. The specific transfer function implemented in the present invention is $$Y(n) = X(n)\left[ z^{-2N} - B\frac{(1 - z^{-2N})z^{-(N+1)}}{1 - z^{-2}} + C\frac{(1 - z^{-2N})^2 z^{-2}}{(1 - z^{-2})^2} \right]$$

using "z-transform notation", where z is a unit delay operator (not a variable), and coefficients B and C are set based on code length "N", where N may be equal to 1, 3, 7, or 13 in the presently implemented embodiment. The above transfer function is a modification of the transfer function derived in the IEEE article, and these modifications were implemented in order to achieve the performance improvements provided by the present invention.

Figure 1:
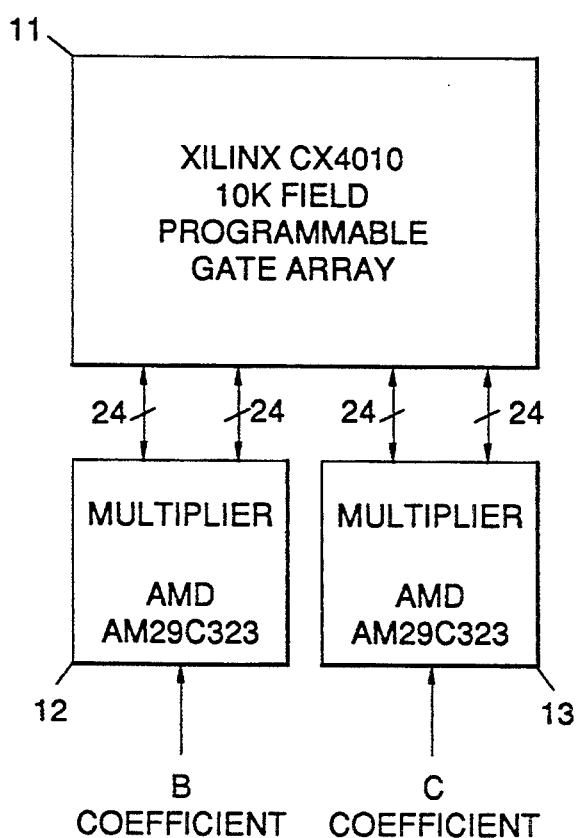
FIG. 1. is a block diagram of a three term ripple suppression apparatus in accordance with the present invention that implements a three term ripple suppression algorithm.

Referring to the FIG. 1, it is a top level block diagram of three term ripple suppression apparatus 10 in accordance with the present invention. The three term ripple suppression apparatus 10 is comprised of a field programmable gate array 11, such as a model XC4010 field programmable gate array 11, manufactured by Xilinx, for example. The field programmable gate array 11 is coupled to two 32-bit multipliers 12, 13, such as model AM29C323 32-bit multipliers, manufactured by Advanced Micro Devices, for example. It is to be understood that field programmable gate arrays 11 and multipliers 12, 13 other that the above-cited examples used in the disclosed embodiment may be readily employed in the present invention by those skilled in the art. Also, the interconnection and programming of the field programmable gate array 11 and multipliers 12, 13 is generally well-known in the art, and their design and operation is readily derived from application notes and product literature, and the like, available from the manufacturers.

Inputs to the field programmable gate array 11 include an radar input signal, X(n), a clock signal, a code select signal. The two 32-bit multipliers 12, 13 respectively receive the B and C coefficients, which are coupled to the field programmable gate array 11. The field programmable gate array 11 provides a radar output signal Y(N) that is computed in accordance with the above cited transfer function.

Figure 2:
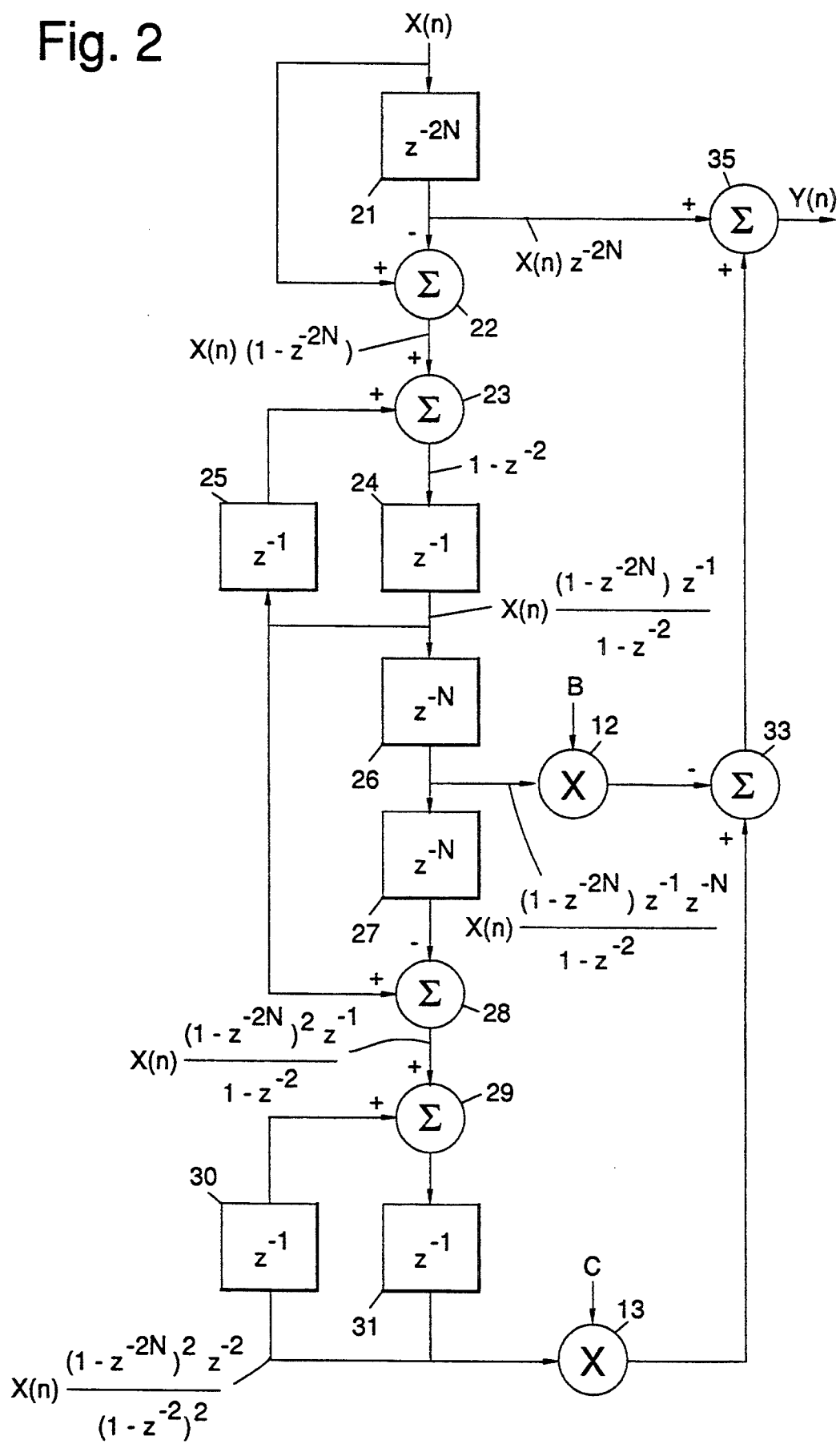
FIG. 2 shows a desired transfer function that is to be implemented by the present invention.

FIG. 2 shows the desired transfer function that is to be implemented by the three term ripple suppression apparatus 10 of the present invention. An input signal X(n) is input into a $z^{-2N}$ delay operator 21. Two serially coupled summers 22, 23 are coupled between the $z^{-2N}$ delay operator 21 and a first $z^{-1}$ delay operator 24. The output of the first $z^{-1}$ delay operator 24 is coupled to a second $z^{-1}$ delay operator 25 and to a first $z^{-N}$ delay operator 26. The output of the first $z^{-N}$ delay operator 26 is coupled to the first multiplier 12. The output of the first $z^{-N}$ delay operator 26 is also coupled through a second $z^{-N}$ delay operator 27 to a third summer 28 that also receives the output of the first $z^{-1}$ delay operator 24. The output of the third summer 28 is coupled through a fourth summer 29 to a third $z^{-1}$ delay operator 31 whose output is coupled in a feedback path through a fourth $z^{-1}$ delay operator 26 to the fourth summer 29 and to the multiplier 13. The outputs of the first and second multipliers 12, 13 are coupled to a fifth summer 33 whose output is combined in a sixth summer 35 with the output of the $z^{-2N}$ delay operator 21 to produce the output signal Y(n).

Figure 3:
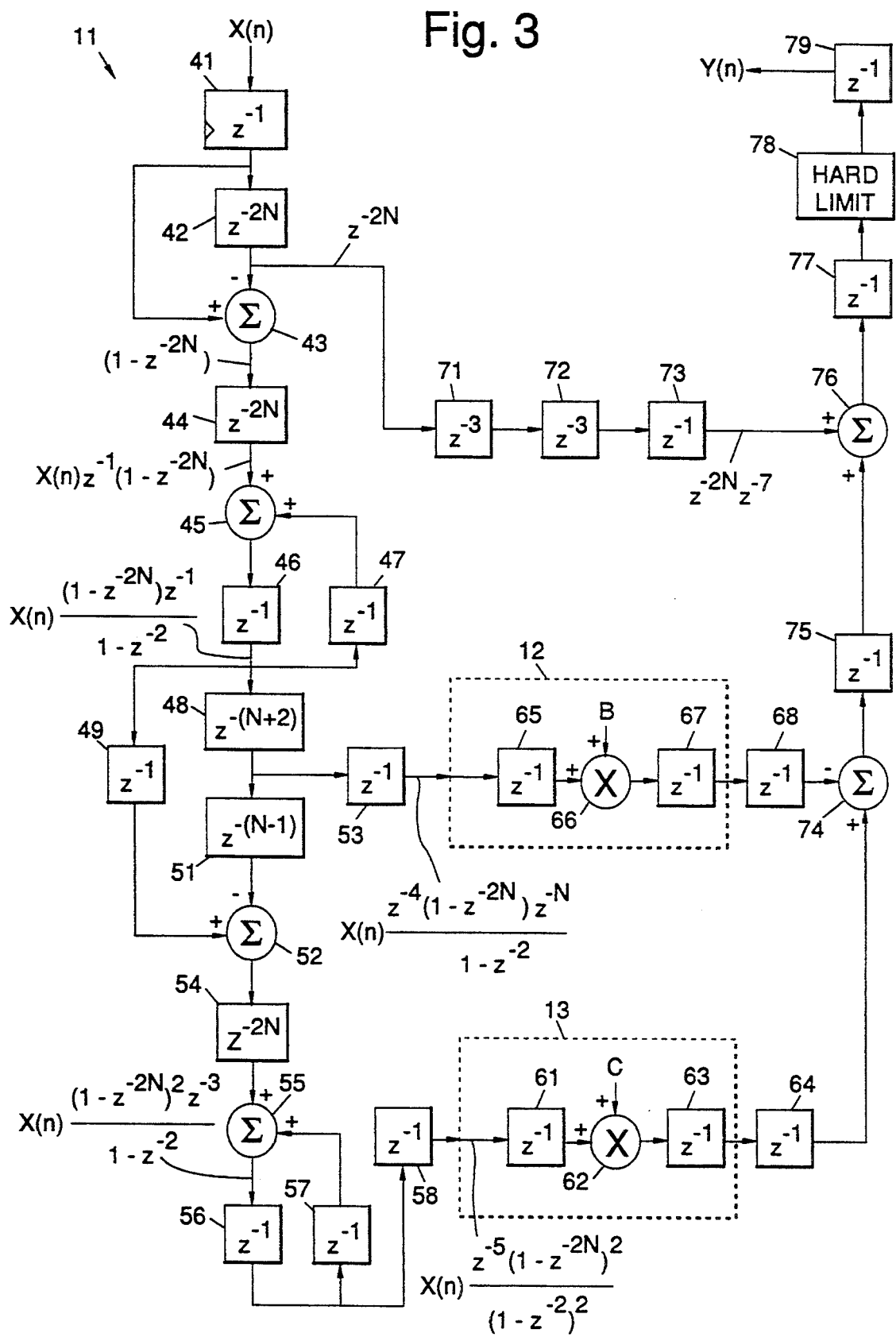
FIG. 3 shows an implemented embodiment of the apparatus shown in FIG. 1 that implements the transfer function that of FIG. 2.

FIG. 3 shows an implemented embodiment of the three term ripple suppression apparatus 10 shown in FIG. 1 that implements the transfer function shown in FIG. 2. The implemented three term ripple suppression apparatus 10 includes the field programmable gate array 11 and the two multipliers 12, 13 (shown in dashed boxes). The field programmable gate array 11 includes a first $z^{-1}$ delay operator 41 that receives the input signal X(n). The first $z^{-1}$ delay operator 41 is coupled through a first $z^{-N}$ delay operator 42 to a first input of a first summer 43, whose second input is coupled to receive the output of the first $z^{-1}$ delay operator 41. The output of the first summer 43 is coupled through a second $z^{-2N}$ delay operator 44 to a second summer 45. The output of the first summer 43 comprises the term $(1-z^{-2N})$. The output of the second $z^{-2N}$ delay operator 44 comprises the term $X(n)z^{-1}(1-z^{-2N})$.

The output of the second summer 45 is coupled to a second $z^{-1}$ delay operator 46 whose output is coupled in a feedback path through a third $z^{-1}$ delay operator 47 to a second input of the second summer 45, and through a fourth $z^{-1}$ delay operator 49 to a first input of a third summer 52. The output of the second $z^{-1}$ delay operator 46 is coupled through a $z^{-(N+2)}$ delay operator 48 and a $z^{-(N-1)}$ delay operator 51 to a second input of the third summer 52. The output of the second $z^{-1}$ delay operator 46 comprises the term $X(n)[z^{-1}(1-z^{-2N})/(1-z^{-2})]$. The output of the $z^{-(N+2)}$ delay operator 48 is coupled through a fifth $z^{-1}$ delay operator 53 to the first multiplier 12. The output of the fifth $z^{-1}$ delay operator 53 comprises the term $X(n)[z^{-4}(1-z^{-2N})z^{-N}/(1-z^{-2})]$.

The output of the third summer 52 is coupled through a $z^{-2N}$ delay operator 54 to a first input of a fourth summer 55. The output of the fourth summer 55 is coupled through a sixth $z^{-1}$ delay operator 56 and through a feedback path containing a seventh $z^{-1}$ delay operator 57 to a second input of the fourth summer 55. The output of the fourth summer 55 comprises the term $X(n)[z^{-3}(1-z^{-2N})/(1-z^{-2})]$. The output of the sixth $z^{-1}$ delay operator 56 is also coupled to a eighth $z^{-1}$ delay operator 58 whose output is coupled to the second multiplier 13. The output of the eighth $z^{-1}$ delay operator 58 comprises the term $X(n)[z^{-5}(1-z^{-2N})^2/(1-z^{-2})^2]$.

The second multiplier 13 is comprised of a ninth $z^{-1}$ delay operator 61 a multiplier 62 that is adapted to receive the C coefficient, and a tenth $z^{-1}$ delay operator 63. The output of the second multiplier 13 is coupled through an eleventh $z^{-1}$ delay operator 64 to a first input of a fifth summer 74. The first multiplier 12 is comprised of a twelfth $z^{-1}$ delay operator 65 a multiplier 66 that is adapted to receive the B coefficient, and a thirteenth $z^{-1}$ delay operator 67. The output of the second multiplier 13 is coupled through an fourteenth $z^{-1}$ delay operator 68 to a second input of the fifth summer 74.

The output of the fifth summer 74 is coupled through a fifteenth $z^{-1}$ delay operator 75 to a first input of the sixth summer 76. The output of the $z^{-2N}$ delay operator 42 (which comprises the term $z^{-2N}$) is coupled through a first $z^{-3}$ delay operator 71, a second $z^{-3}$ delay operator 71, and a sixteenth $z^{-1}$ delay operator 73 to a second input of the sixth summer 76. This series of delay operators 71, 72, 73 produces the term $z^{-2N}z^{-7}$. The output of the sixth summer 76 is coupled through a seventeenth $z^{-1}$ delay operator 77 and a hard limit 78 to a eighteenth $z^{-1}$ delay operator 79 which produces the output signal Y(n) from the apparatus 10.

The present three term ripple suppression apparatus 10 has been tested in a radar imaging system developed by the assignee of the present invention. Design verification was performed by comparing hardware implementation output with the output of a software simulation of the algorithm for each code length.

Thus there has been described a new and improved ripple suppression apparatus for use in radar systems, and the like. It is to be understood that the above-described embodiment is merely illustrative of some of the many specific embodiments which represent applications of the principles of the present invention. Clearly, numerous and other arrangements can be readily devised by those skilled in the art without departing from the scope of the invention.

What is claimed is:

1. Three term ripple suppression apparatus for suppressing ripple in a radar image derived from received radar signals, said apparatus comprising:

a field programmable gate array having a radar signal input, a clock signal input, a code select signal input, and a radar signal output, and that is adapted to implement a transfer function having the form $$Y(n) = X(n)\left[z^{-2N} - B\frac{(1-z^{-2N})z^{-(N+1)}}{1-z^{-2}} + C\frac{(1-z^{-2N})^2 z^{-2}}{(1-z^{-2})^2}\right]$$

where z is a unit delay operator, and where B and C are coefficients that are set based on a code length N; and first and second multipliers respectively coupled to the field programmable gate array that are adapted to receive first (B) and second (C) coefficients and transfer them to the field programmable gate array.

2. Three term ripple suppression apparatus of claim 1 wherein the first and second multipliers each comprise 32-bit multipliers.

3. Three term ripple suppression apparatus of claim 1 wherein N is equal to 1.

4. Three term ripple suppression apparatus of claim 1 wherein N is equal to 3.

5. Three term ripple suppression apparatus of claim 1 wherein N is equal to 7.

6. Three term ripple suppression apparatus of claim 1 wherein N is equal to 13.

* * * * *